United States Patent
Zou et al.

(10) Patent No.: US 11,435,912 B2
(45) Date of Patent: Sep. 6, 2022

(54) METHOD, ELECTRONIC DEVICE, AND COMPUTER PROGRAM PRODUCT FOR DATA STORAGE

(71) Applicant: EMC IP Holding Company LLC, Hopkinton, MA (US)

(72) Inventors: Weining Zou, Shanghai (CN); Gary Jialei Wu, Shanghai (CN); Zhiyao Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/246,267

(22) Filed: Apr. 30, 2021

(65) Prior Publication Data

US 2022/0214820 A1 Jul. 7, 2022

(30) Foreign Application Priority Data

Jan. 6, 2021 (CN) .......................... 202110014482.6

(51) Int. Cl.
*G06F 12/00* (2006.01)
*G06F 3/06* (2006.01)
(52) U.S. Cl.
CPC ............ *G06F 3/0631* (2013.01); *G06F 3/064* (2013.01); *G06F 3/0619* (2013.01); *G06F 3/0652* (2013.01); *G06F 3/0659* (2013.01); *G06F 3/0673* (2013.01)

(58) Field of Classification Search
CPC ...... G06F 3/0631; G06F 3/0619; G06F 3/064; G06F 3/0652; G06F 3/0659; G06F 3/0673
See application file for complete search history.

(56) References Cited

U.S. PATENT DOCUMENTS 8,099,549 B1 * 1/2012 Madnani ................. G06F 3/067
370/312

\* cited by examiner

*Primary Examiner* — John A Lane
(74) *Attorney, Agent, or Firm* — Amin, Turocy & Watson, LLP

(57) ABSTRACT

Data storage is disclosed. For instance, a request for storing target data is received including the target data and indicating the number of copies of the target data to be stored, based upon which storage chunks for storing the target data are allocated. Each storage chunk includes a data segment and a coding segment, and a group of the storage chunks are respectively configured to store a number of copies of the target data. The first number of copies are written to the data segment of each storage chunk in the group respectively. For one of the group of storage chunks, first check information is generated for checking data stored in the data segment of the storage chunk. Further, the first check information is written to the coding segment of each storage chunk in the group of storage chunks. The efficiency of multi-copy data storage is increased while reducing memory consumption.

20 Claims, 4 Drawing Sheets

METHOD, ELECTRONIC DEVICE, AND COMPUTER PROGRAM PRODUCT FOR DATA STORAGE

RELATED APPLICATION

The present application claims the benefit of priority to Chinese Patent Application No. 2021100144826, filed on Jan. 6, 2021, which application is hereby incorporated into the present application by reference herein in its entirety.

TECHNICAL FIELD

Embodiments of the present disclosure generally relate to the field of data storage, and more particularly, to a method, an electronic device, and a computer program product for data storage.

BACKGROUND

In a storage system, data may be stored in one or more pre-divided storage chunks. To ensure that data is not lost, each storage chunk may include a plurality of data segments configured to store data and a plurality of coding segments configured to store check information (e.g., erasure codes). The check information stored in the plurality of coding segments may be generated based on the data stored in the plurality of data segments. The data segments and coding segments of each storage chunk may be stored in a plurality of storage devices. In this way, when a storage device fails, data stored in the storage device may be restored by data and/or check information stored in other storage devices.

In some application scenarios, users may need to store a plurality of copies for the same data. Because the amount of data is large, it may be necessary to generate check information for a large number of storage chunks, which will consume a lot of CPU and memory resources.

SUMMARY

Embodiments of the present disclosure provide a method, an electronic device, and a computer program product for data storage.

In a first aspect of the present disclosure, a method for data storage is provided. The method includes: receiving a request for storing target data, the request including the target data and indicating the number of copies of the target data to be stored; allocating, based on the target data and the number of copies, a plurality of storage chunks for storing the copies of the target data, each storage chunk including a data segment configured to store data and a coding segment configured to store check information, and a group of storage chunks in the plurality of storage chunks being respectively configured to store a first number of copies of the target data; writing the first number of copies to the data segment of each storage chunk in the group of storage chunks respectively; generating, for one storage chunk in the group of storage chunks, first check information for checking the data stored in the data segment of the storage chunk; and writing the first check information to the coding segment of each storage chunk in the group of storage chunks respectively.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause an apparatus to perform actions including: receiving a request for storing target data, the request including the target data and indicating the number of copies of the target data to be stored; allocating, based on the target data and the number of copies, a plurality of storage chunks for storing the copies of the target data, each storage chunk including a data segment configured to store data and a coding segment configured to store check information, and a group of storage chunks in the plurality of storage chunks being respectively configured to store a first number of copies of the target data; writing the first number of copies to the data segment of each storage chunk in the group of storage chunks respectively; generating, for one storage chunk in the group of storage chunks, first check information for checking the data stored in the data segment of the storage chunk; and writing the first check information to the coding segment of each storage chunk in the group of storage chunks respectively.

In a third aspect of the present disclosure, a computer-readable storage medium is provided. Machine-executable instructions are stored thereon. The machine-executable instructions, when executed by a device, cause the device to perform any step of the method described according to the above first aspect.

In a fourth aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary section is provided to introduce the selection of concepts in a simplified form, which will be further described in the Detailed Description below. The Summary section is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing the example embodiments of the present disclosure in more detail in combination with the accompanying drawings. In the example embodiments of the present disclosure, the same reference numerals generally represent the same parts.

In the accompanying drawings, the same or corresponding numerals represent the same or corresponding parts.

DETAILED DESCRIPTION

Figure 1:
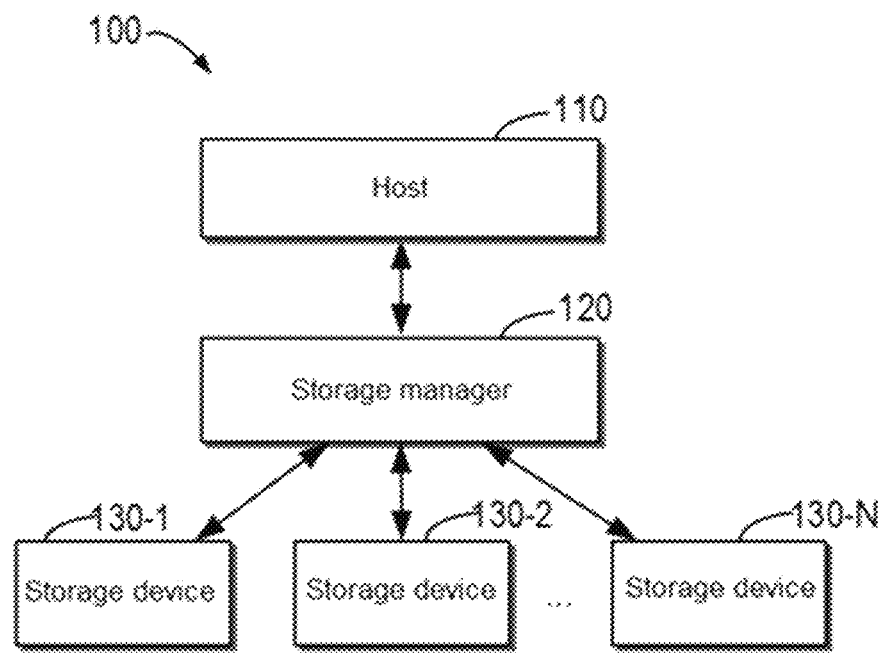
FIG. 1 shows a schematic diagram of an example environment in which embodiments of the present disclosure can be implemented.

Example embodiments of the present disclosure will be described in more detail below with reference to the accompanying drawings. Although the example embodiments of the present disclosure are shown in the accompanying drawings, it should be understood that the present disclosure can be implemented in various forms and should not be limited by the embodiments set forth herein. Instead, the embodiments are provided to make the present disclosure more thorough and complete and to fully convey the scope of the present disclosure to those skilled in the art.

The term "include" and variants thereof as used herein indicate open-ended inclusion, i.e., "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described above, in a storage system, data may be stored in one or more pre-divided storage chunks. To ensure that data is not lost, each storage chunk may include a plurality of data segments configured to store data and a plurality of coding segments configured to store check information (e.g., erasure codes). The check information stored in the plurality of coding segments may be generated based on the data stored in the plurality of data segments. The data segments and coding segments of each storage chunk may be stored in a plurality of storage devices. In this way, when a storage device fails, data stored in the storage device may be restored by data and/or check information stored in other storage devices.

In a multi-copy data storage scenario (e.g., digital video recording), users may need to store a plurality of copies for the same data. The plurality of copies of data may be stored in a large number of storage chunks. Generally, a single CPU core may be used to generate check information for data in a data segment in a storage chunk. A plurality of CPU cores may be used to generate corresponding check information in parallel for a plurality of storage chunks. In the multi-copy data storage scenario, since the amount of data is large, check information needs to be generated for a large number of storage chunks. When the number of CPU cores is insufficient, check information can only be generated in batches, which will take a long time. In addition, generating the check information needs to read data segment data into a memory. When check information is generated for a large number of storage chunks, the memory consumed will be huge.

A solution for data storage is proposed in the embodiments of the present disclosure to solve the above problem and one or more of other potential problems. In this solution, based on target data to be stored and the number of copies thereof, a plurality of storage chunks are allocated for storing the copies of the target data. At least part of the storage chunks in the plurality of storage chunks may be configured to store the same number of copies of the target data. In this case, check information may be generated only for one storage chunk in the at least part of the storage chunks, and the check information may be directly applied to the other storage chunks in the part of the storage chunks (i.e., there is no need to execute a check information generation task for the other storage chunks). In some cases, the plurality of storage chunks may also include at least one storage chunk configured to store another number of copies of the target data. Check information may be generated for the at least one storage chunk. In this way, the number of required check information generation tasks can be greatly reduced, thereby improving the efficiency of multi-copy data storage while reducing memory consumption.

The embodiments of the present disclosure will be described below in detail with reference to the accompanying drawings. FIG. 1 shows a block diagram of example environment 100. As shown in FIG. 1, environment 100 includes host 110, storage manager 120, and a plurality of storage devices 130-1, 130-2, . . . , 130-N (collectively or individually referred to as "storage device 130," where N>1). It should be understood that the structure of environment 100 is described for illustrative purposes only, and does not imply any limitation to the scope of the present disclosure. For example, the embodiments of the present disclosure may also be applied to an environment different from environment 100.

Host 110 may be, for example, any physical computer, virtual machine, server, or the like where a user application is run. Host 110 may send an Input/Output (I/O) request to storage manager 120 to, for example, read data from storage device 130 and/or write data into storage device 130. In response to receiving a read request from host 110, storage manager 120 may read the stored data from storage device 130 and return the read data to host 110. In response to receiving a write request from host 110, storage manager 120 may write data to be stored to storage device 130. Storage device 130 may be any non-volatile storage medium currently known or to be developed in the future, such as a magnetic disk, a solid state disk (SSD), or a disk array.

Figure 2:
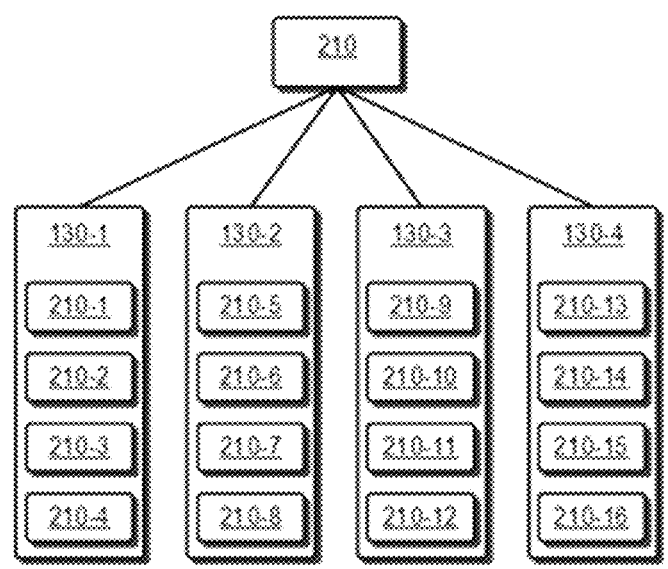
FIG. 2 shows a schematic diagram of an example storage chunk according to an embodiment of the present disclosure.

In order to store data in storage device 130, one or more storage chunks for storing data may be obtained through division. For example, each storage chunk may be configured to store a fixed amount of data. FIG. 2 shows a schematic diagram of example storage chunk 210 according to an embodiment of the present disclosure.

As shown in FIG. 2, storage chunk 210 may include, for example, 12 data segments 210-1, 210-2, . . . , 210-12 that are configured to store data, and 4 coding segments 210-13, 210-14, . . . , 210-16 that are configured to store check information. The check information (for example, erasure codes) stored in coding segments 210-13, 210-14, . . . , 210-16 may be generated based on the data stored in data segments 210-1, 210-2, . . . , 210-12, so as to ensure that when at most 4 of segments 210-1, 210-2, . . . , 210-16 are lost (e.g., due to a failure of the storage device), the lost data can be restored from the remaining segments. As shown in FIG. 2, for example, segments 210-1, 210-2, . . . , 210-16 in data unit 210 may be stored in storage devices 130-1, 130-2, 130-3, and 130-4, respectively. In this way, when one of storage devices 130-1, 130-2, 130-3, and 130-4 fails, data and/or check information in the other storage devices may be used to recover data in the failed device.

It should be understood that the number of data segments and coding segments shown in FIG. 2 is shown for illustrative purposes only, and does not imply any limitation to the scope of the present disclosure. In other embodiments, the storage chunk may include different numbers of data segments and coding segments.

Figure 3:
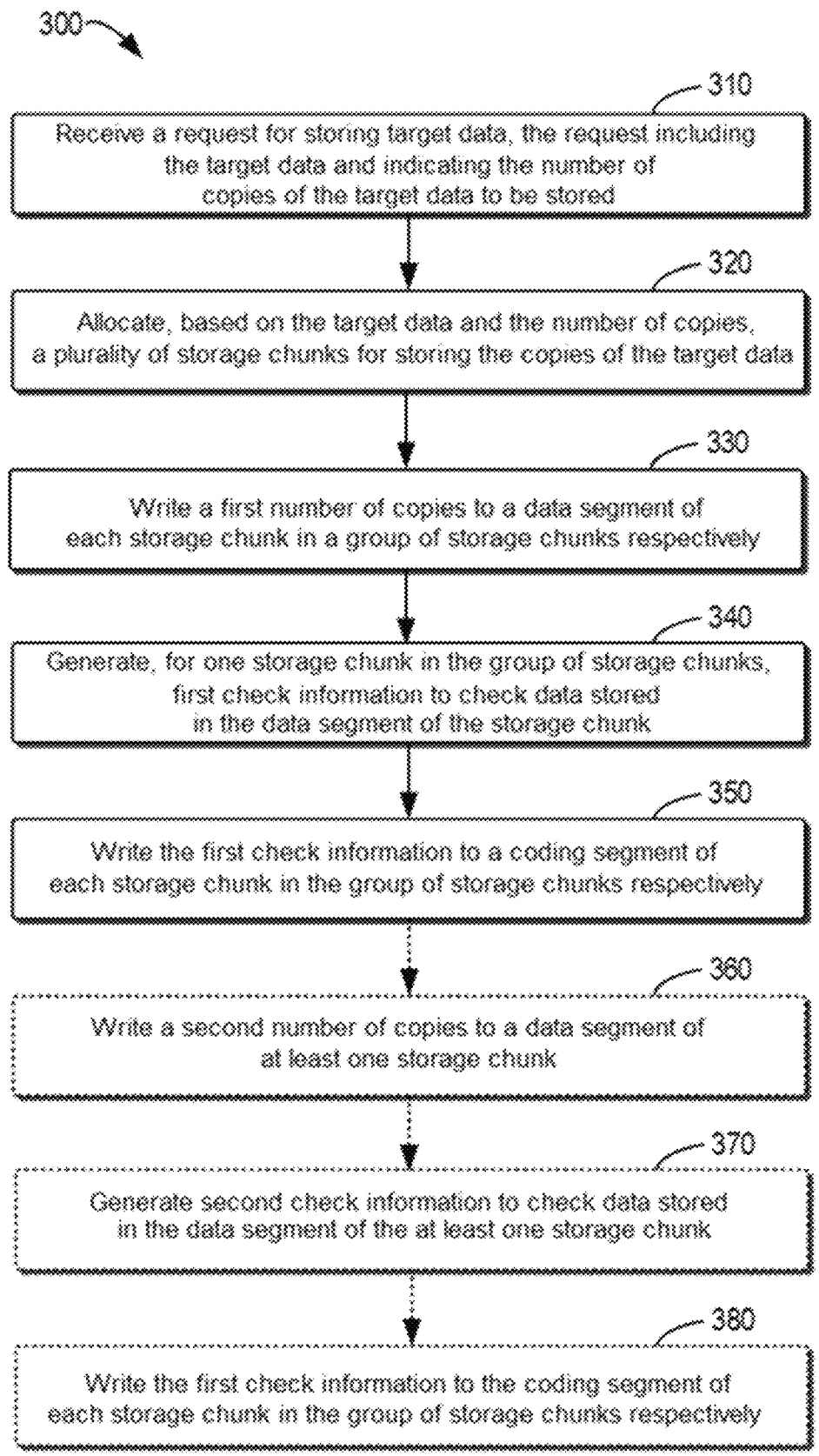
FIG. 3 shows a flow chart of an example method for data storage according to an embodiment of the present disclosure.

FIG. 3 shows a flow chart of example method 300 for storing data according to an embodiment of the present disclosure. Method 300 may be executed, for example, by storage manager 120 shown in FIG. 1. Method 300 is described in detail below with reference to FIG. 1.

As shown in FIG. 3, at block 310, storage manager 120 receives a request for storing target data. The request includes the target data and indicates the number of copies of the target data to be stored.

In some embodiments, storage manager 120 may receive a request from host 110. For example, the request indicates 2000 copies to be stored for video data of 4.5 MB. That is, the amount of valid data to be stored is 4.5 MB×2000=9 GB. For purposes of illustration and not limitation, various details of the embodiments of the present disclosure will be described in detail below in conjunction with this example.

At block 320, storage manager 120 allocates, based on the target data and the number of copies, a plurality of storage chunks for storing the copies of the target data. In some embodiments, each storage chunk may include a plurality of data segments configured to store data and a plurality of coding segments configured to store check information. In some embodiments, a group of storage chunks in the plurality of storage chunks are respectively configured to store a first number of copies of the target data.

Referring to the above example, it is assumed that each of the allocated storage chunks may be configured to store valid data of 128 MB. Since some additional information may be stored when each copy is stored in the corresponding storage chunk, the number of allocated storage chunks may be slightly larger than the ratio of a total amount of valid data to the amount of valid data that each storage chunk can store.

Figure 4:
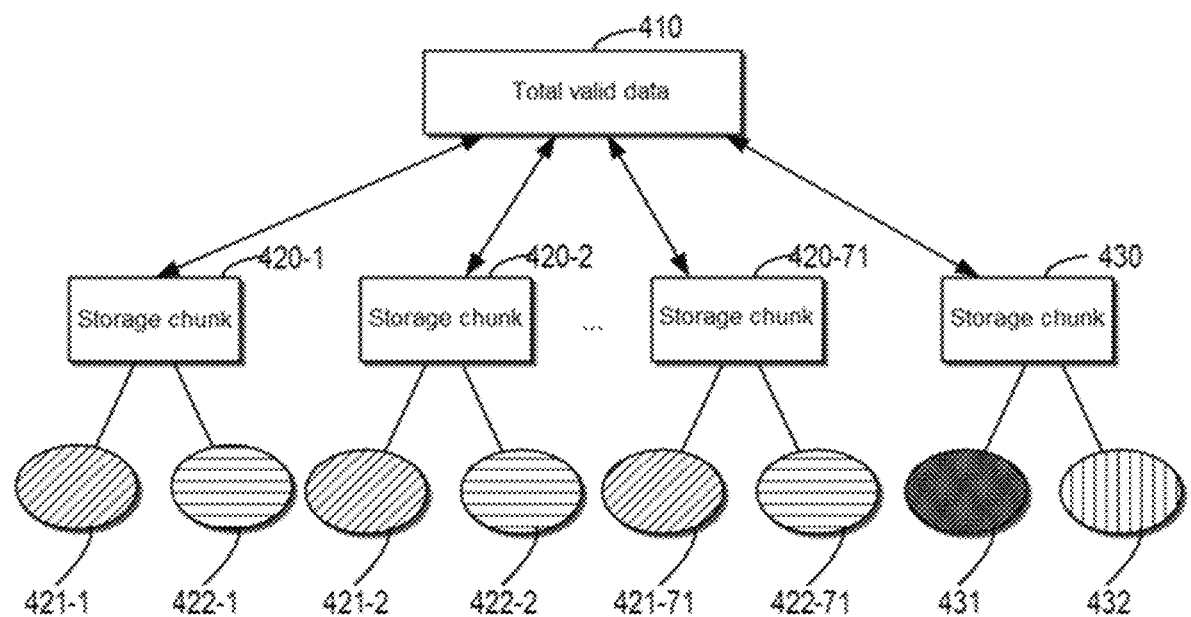
FIG. 4 shows a schematic diagram of a storage chunk allocated for a total amount of valid data according to an embodiment of the present disclosure.

FIG. 4 shows a schematic diagram of storage chunks allocated for a total amount of valid data according to an embodiment of the present disclosure. As shown in FIG. 4, for valid data amount 410 of, for example, 9 GB, 72 storage chunks 420-1 to 420-71 and 430 may be allocated. Storage chunks 420-1 to 420-71 are respectively configured to store the same number (i.e., first number) of copies of the target data. For example, 128/4.5=28 copies. The remaining storage chunk 420-72 is configured to store the remaining number of copies. That is, 2000-28×71=12 copies. Taking storage chunk 420-1 as an example, it may include a plurality of data segments 421-1 and a plurality of coding segments 422-1 . . . . Taking storage chunk 420-71 as an example, it may include a plurality of data segments 421-71 and a plurality of coding segments 422-71. Taking storage chunk 430 as an example, it may include a plurality of data segments 431 and a plurality of coding segments 432. In the following, storage chunks 420-1 to 420-71 are collectively or individually referred to as "storage chunk 420," data segments 421-1 to 421-71 are collectively or individually referred to as "data segment 421," and coding segments 422-1 to 422-71 are collectively or individually referred to as "coding segment 422."

At block 330, storage manager 120 writes the first number of copies to the data segment of each storage chunk in the group of storage chunks respectively. In some embodiments, each copy in the first number of copies may be encapsulated in a data block. The data block may include a corresponding copy and additional information thereof.

Figure 5:
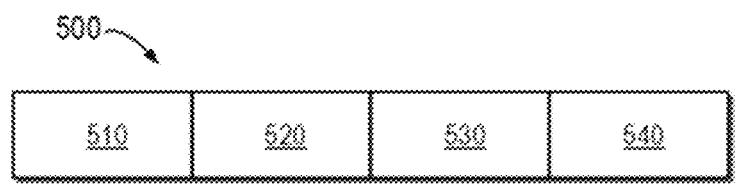
FIG. 5 shows a schematic diagram of an example data block according to an embodiment of the present disclosure.

FIG. 5 shows a schematic diagram of example data block 500 according to an embodiment of the present disclosure. As shown in FIG. 5, for example, data block 500 may include fields 510 to 540. Field 520 may, for example, store a copy of the target data (e.g., video data of 4.5 MB), and field 510 may, for example, indicate the length of data stored in field 520. Field 530 may, for example, store a checksum calculated for the data stored in field 520. Field 540 may, for example, store an identifier associated with a write request to identify which write request the data stored in field 520 is associated with. In some embodiments, a newly created storage chunk may reuse a data block used by a deleted storage chunk. Field 540 may be configured to ensure that old data in the data block will not be regarded as valid data. For example, if an identifier stored in field 540 does not match a current write request, it may be determined that data in the data block is old data.

In some embodiments, storage manager 120 may write a first number of data blocks to the data segment of each storage chunk in the group of storage chunks respectively. For example, write operations for the data segments of all the storage chunks may be executed in parallel. In this way, the first number of copies are written to the data segment of each storage chunk in the group of storage chunks. In some embodiments, in response to the first number of copies being written to the data segment of one storage chunk, if it is determined that the data segment of the storage chunk still has an unoccupied space, storage manager 120 may fill the space with invalid data (e.g., 0). In this way, data stored in the data segment of each storage chunk in the group of storage chunks is identical.

For example, in the example shown in FIG. 4, storage manager 120 may write 28 data blocks to data segment 421 of each storage chunk 420 of storage chunks 420-1 to 420-71, and fill the remaining space in data segment 421 of each storage chunk 420 with 0. In this way, the data stored in the data segments of storage chunks 420-1 to 420-71 is identical.

Referring back to FIG. 3, at block 340, storage manager 120 generates first check information based on the data stored in the data segment of one storage chunk in the group of storage chunks. Then, at block 350, storage manager 120 writes the first check information to the coding segment of each storage chunk in the group of storage chunks respectively. In some embodiments, write operations for the coding segments of all the storage chunks may be executed in parallel.

For example, in the example shown in FIG. 4, storage manager 120 may generate erasure codes based on data (including 28 data blocks and filled invalid data) in data segment 421 of any storage chunk 420 in storage chunks 420-1 to 420-71. Storage manager 120 may write the generated erasure codes to coding segment 422 of each storage chunk 420. As described above, since the data stored in respective data segments 421 of storage chunks 420-1 to 420-71 is identical, the check information stored in their respective coding segments 422 is also identical. In this way, it is possible to avoid generating respective erasure codes for 71 storage chunks.

In some embodiments, according to the size of the target data and the number of copies to be stored, the allocated plurality of storage chunks may only include a group of storage chunks configured to store the same number (e.g., first number) of copies. Additionally, in other embodiments, the plurality of storage chunks may further include at least one storage chunk configured to store a second number of copies of the target data, where the second number is different from the first number. For example, in the example shown in FIG. 4, storage chunk 430 is configured to store the remaining number of copies. That is, 2000-28×71=12 copies.

In this case, as shown in FIG. 3, at block 360, storage manager 120 writes a second number of copies to the data segment of the at least one storage chunk.

In some embodiments, each copy in the second number of copies may be encapsulated in a data block. Storage manager 120 may write the second number of data blocks to the data segment of the at least one storage chunk. For example, each data block in the second number of data blocks may have a structure as shown in FIG. 4. In some embodiments, in response to the second number of copies being written to the data segment of the at least one storage chunk, if it is determined that the data segment of the at least one storage chunk still has an unoccupied space, storage manager 120 may fill the space with invalid data (e.g., 0).

For example, in the example shown in FIG. 4, storage manager 120 may write 12 data blocks to data segment 431 of storage chunk 430, and fill the remaining space in data segment 431 with 0.

At block 370, storage manager 120 generates second check information based on the data stored in the data segment of the at least one storage chunk. Then, at block 380, storage manager 120 writes the second check information to the coding segment of the at least one storage chunk.

For example, in the example shown in FIG. 4, storage manager 120 may generate an erasure code based on data (including 12 data blocks and filled invalid data) in data segment 431 of storage chunk 430. Storage manager 120 may write the generated erasure code to coding segment 432 of storage chunk 430.

Although in FIG. 5, blocks 360 to 380 are shown to be executed after block 350, it should be understood that blocks 360 to 380 may also be executed in parallel with blocks 330 to 350 to further reduce the time required for data storage. In addition, method 300 may further include additional blocks not shown in FIG. 3 and/or omit the blocks shown in FIG. 3, and the scope of the present disclosure is not limited in this regard.

It can be seen from the above description that in conventional solutions, storing 2000 copies for video data of 4.5M requires generating respective check information for 72 storage chunks. That is, the number of check information generation tasks is 72. In the solution according to the embodiments of the present disclosure, storing 2000 copies for video data of 4.5M only requires generating respective check information for 2 storage chunks. That is, the number of check information generation tasks is 2. Therefore, the embodiments of the present disclosure can significantly reduce CPU resources and time consumed for multi-copy data storage. In addition, in conventional solutions, storing 2000 copies for video data of 4.5M requires more than 9 GB of memory space. In the solution according to the embodiments of the present disclosure, storing 2000 copies for video data of 4.5M only requires consuming a memory space of 2×128=256 MB. Therefore, the embodiments of the present disclosure can significantly reduce the memory consumption of multi-copy data storage.

Figure 6:
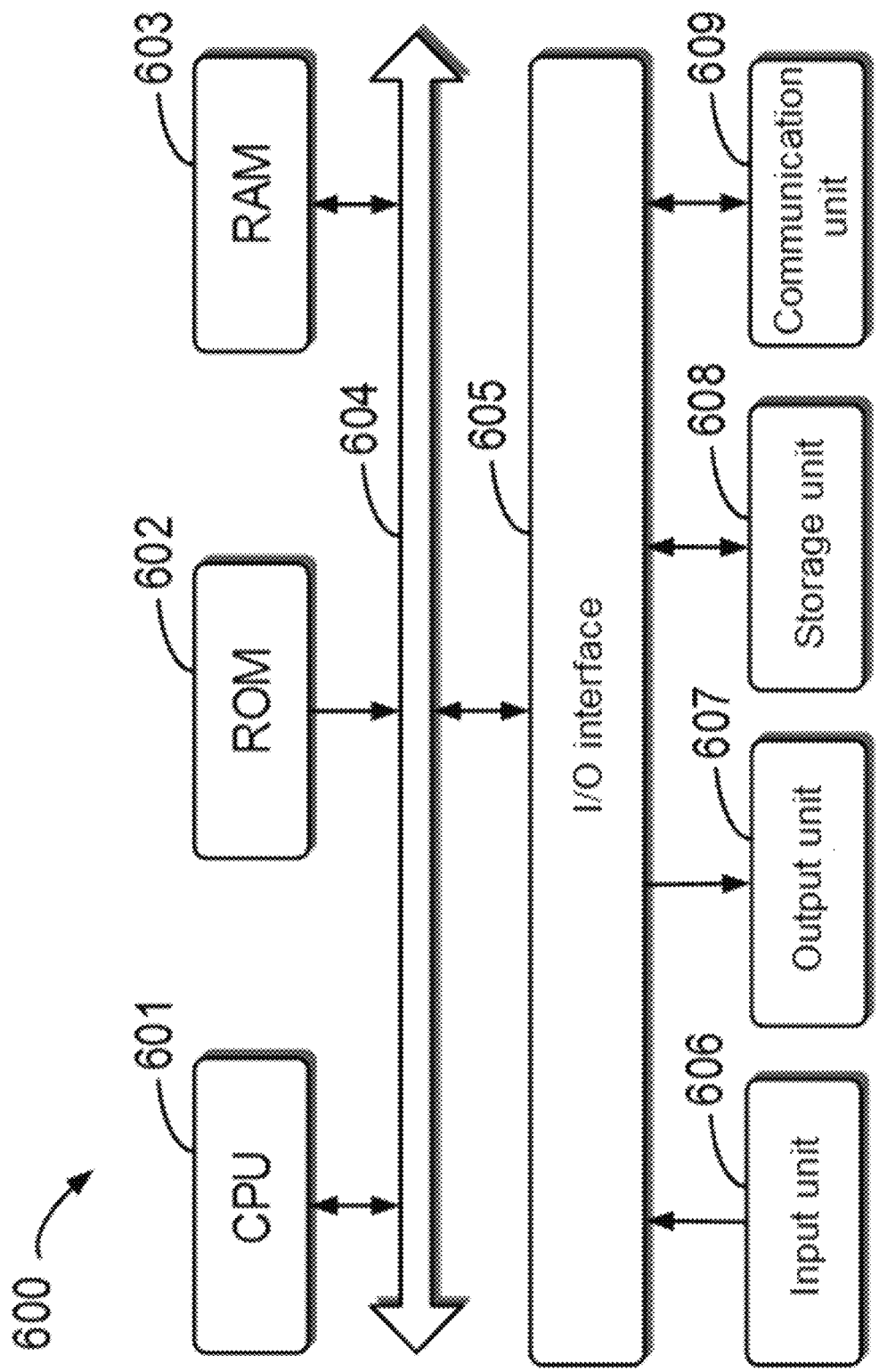
FIG. 6 shows a schematic block diagram of an example device that may be configured to implement an embodiment of the present disclosure.

FIG. 6 shows a schematic block diagram of example device 600 that may be configured to implement an embodiment of the present disclosure. For example, storage manager 120 shown in FIG. 1 may be implemented by device 600. As shown in FIG. 6, device 600 includes central processing unit (CPU) 601 that may perform various appropriate actions and processing according to computer program instructions stored in read-only memory (ROM) 602 or computer program instructions loaded from storage chunk 608 to random access memory (RAM) 603. Various programs and data required for the operation of device 600 may also be stored in RAM 603. CPU 601, ROM 602, and RAM 603 are connected to one another through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage chunk 608, such as a magnetic disk and an optical disk; and communication unit 609, such as a network card, a modem, and a wireless communication transceiver. Communication unit 609 allows device 600 to exchange information/data with other devices over a computer network such as an Internet and/or various telecommunication networks.

Various processes and processing described above, for example, method 300, may be performed by processing unit 601. For example, in some embodiments, method 300 may be implemented as a computer software program that is tangibly included in a machine-readable medium such as storage chunk 608. In some embodiments, part or all of the computer program may be loaded and/or installed onto device 600 via ROM 602 and/or communication unit 609. When the computer program is loaded to RAM 603 and executed by CPU 601, one or more actions of method 300 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, for example, a programmable logic circuit, a field programmable gate array (FPGA), or a programmable logic array (PLA), is personalized by utilizing the state information of the computer-readable program instructions, wherein the electronic circuit may execute computer-readable program instructions so as to implement various aspects of the present disclosure.

Various aspects of the present disclosure are described herein with reference to flow charts and/or block diagrams of the method, the apparatus (system), and the computer program product according to the embodiments of the present disclosure. It should be understood that each block in the flow charts and/or block diagrams as well as a combination of blocks in the flow charts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the accompanying drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

What is claimed is:

1. A method, comprising:
receiving, by a system comprising a processor, a request for storing target data, the request comprising the target data and indicating a number of copies of the target data to be stored;
allocating, based on the target data and the number of copies, a plurality of storage chunks for storing the copies of the target data,
each storage chunk of the plurality of storage chunks comprising a respective data segment configured to store respective data and a respective coding segment configured to store respective check information, and a group of storage chunks in the plurality of storage chunks being respectively configured to store a first number of copies of the target data;
writing the first number of copies to the respective data segments of each storage chunk in the group of storage chunks respectively;
generating, for one storage chunk in the group of storage chunks, first check information based on the respective data stored in the respective data segment of the one storage chunk; and
writing the first check information to the respective coding segments of each storage chunk in the group of storage chunks respectively.

2. The method according to claim 1, wherein at least one storage chunk in the plurality of storage chunks is configured to store a second number of copies of the target data, and the method further comprises:
writing the second number of copies to at least one respective data segment of the at least one storage chunk;
generating second check information based on the respective data stored in the at least one respective data segment of the at least one storage chunk; and
writing the second check information to at least one respective coding segment of the at least one storage chunk.

3. The method according to claim 2, wherein writing the second number of copies to the at least one respective data segments of the at least one storage chunk comprises:
- generating the second number of data blocks based on the second number of copies, each data block of the second number of data blocks comprising a copy and an identifier associated with the request; and
- writing the second number of data blocks to the at least one respective data segments of the at least one storage chunk.

4. The method according to claim 2, further comprising:
- in response to the second number of copies being written to the at least one respective data segments of the at least one storage chunk, determining whether there is an unoccupied space in the at least one respective data segments of the at least one storage chunk; and
- in response to determining that there is the unoccupied space in the at least one respective data segments of the at least one storage chunk, filling the space with invalid data.

5. The method according to claim 2, wherein generating the second check information comprises:
- generating, based on the data stored in the at least one respective data segments of the at least one storage chunk, an erasure code as the second check information.

6. The method according to claim 1, wherein writing the first number of copies to the respective data segments of each storage chunk in the group of storage chunks respectively comprises:
- generating the first number of data blocks based on the first number of copies, each data block of the first number of data blocks comprising a copy and an identifier associated with the request; and
- writing the first number of data blocks to the respective data segments of each storage chunk in the group of storage chunks respectively.

7. The method according to claim 1, further comprising:
- for each storage chunk in the group of storage chunks,
  - in response to the first number of copies being written to the respective data segment of the storage chunk, determining whether there is an unoccupied space in the respective data segment of the storage chunk; and
  - in response to determining that there is the unoccupied space in the respective data segment of the storage chunk, filling the space with invalid data.

8. The method according to claim 1, wherein generating the first check information comprises:
- generating, based on the data stored in the respective data segment of the storage chunk, an erasure code as the first check information.

9. An electronic device, comprising:
- at least one processing unit; and
- at least one memory coupled to the at least one processing unit and storing instructions for execution by the at least one processing unit, wherein the instructions, when executed by the at least one processing unit, cause the electronic device to perform actions comprising:
  - receiving a request to store target data, the request comprising the target data and indicating a number of copies to be stored for the target data;
  - allocating, based on the target data and the number of copies, storage chunks to store the copies of the target data,
    each storage chunk of the storage chunks comprising a data segment configured to store data and a coding segment configured to store check information, and a group of the storage chunks being configured respectively to store a first number of copies of the target data;
  - writing the first number of copies to the data segment of each storage chunk in the group of the storage chunks respectively;
  - generating, for one storage chunk in the group of the storage chunks, first check information based on data stored in the data segment of the one storage chunk; and
  - writing the first check information to the coding segment of each storage chunk in the group of the storage chunks respectively.

10. The device according to claim 9, wherein at least one storage chunk in the plurality of storage chunks is configured to store a second number of copies of the target data, and the method further comprises:
- writing the second number of copies to at least one data segment of the at least one storage chunk;
- generating second check information based on data stored in the at least one data segment of the at least one storage chunk; and
- writing the second check information to the coding segment of the at least one storage chunk.

11. The device according to claim 9, wherein writing the first number of copies to the data segment of each storage chunk in the group of the storage chunks respectively comprises:
- generating the first number of data blocks based on the first number of copies, each data block comprising a copy and an identifier associated with the request; and
- writing the first number of data blocks to the data segment of each storage chunk in the group of the storage chunks respectively.

12. The device according to claim 9, wherein the actions further comprise:
- for each storage chunk in the group of the storage chunks,
  - in response to the first number of copies being written to the data segment of the storage chunk, determining whether there is an unoccupied space in the data segment of the storage chunk; and
  - based on determining that there is the unoccupied space in the data segment of the storage chunk, filling the space with invalid data.

13. The device according to claim 9, wherein generating the first check information comprises:
- generating, based on the data stored in the data segment of the storage chunk, an erasure code as the first check information.

14. The device according to claim 10, wherein writing the second number of copies to the at least one data segment of the at least one storage chunk comprises:
- generating the second number of data blocks based on the second number of copies, each data block comprising a copy and an identifier associated with the request; and
- writing the second number of data blocks to the at least one data segment of the at least one storage chunk.

15. The device according to claim 10, wherein the actions further comprise:
- in response to the second number of copies being written to the at least one data segment of the at least one storage chunk, determining whether there is an unoccupied space in the at least one data segment of the at least one storage chunk; and based on determining that there is the unoccupied space in the data segment of the at least one storage chunk, filling the space with invalid data.

16. The device according to claim 10, wherein generating the second check information comprises:
    generating, based on the data stored in the at least one data segment of the at least one storage chunk, an second code as the second check information.

17. A computer program product tangibly stored in a non-transitory computer storage medium and comprising machine-executable instructions, wherein when executed by a device, the machine-executable instructions cause the device to perform operations, comprising:
    receiving a request for storage of target data, the request comprising the target data and indicating a number of copies of the target data to be stored;
    allocating, based on the target data and the number of copies, storage chunks for storage of the copies of the target data, wherein the storage chunks comprise respective data segments configured to store respective data and respective coding segments configured to store respective check information, and wherein a group of the storage chunks are configured to store a first number of copies of the target data;
    writing the first number of copies to respective ones of data segments, from the respective data segments, corresponding to the group of the storage chunks;
    generating, for a storage chunk in the group of storage chunks, check information based on data, of the respective data, stored in a data segment, of the respective data segments, of the storage chunk; and
    writing the check information to respective ones of coding segments, of the respective coding segments, corresponding to the group of storage chunks.

18. The computer program product according to claim 17, wherein the check information is first check information, wherein at least one storage chunk in the plurality of storage chunks is configured to store a second number of copies of the target data, and the method further comprises:
    writing the second number of copies to at least one respective data segment of the at least one storage chunk;
    generating second check information based on the respective data stored in the at least one respective data segment of the at least one storage chunk; and
    writing the second check information to at least one respective coding segment of the at least one storage chunk.

19. The computer program product according to claim 17, wherein writing the first number of copies to the respective ones of the data segments in the group of storage chunks respectively comprises:
    generating the first number of data blocks based on the first number of copies, each data block of the first number of data blocks comprising a copy and an identifier associated with the request; and
    writing the first number of data blocks to the respective ones of the data segments in the group of storage chunks.

20. The computer program product according to claim 17, wherein generating the first check information comprises:
    generating, based on the data stored in the data segment, an erasure code as the check information.

* * * * *